United States Patent
Ebesu

(10) Patent No.: US 9,025,483 B2
(45) Date of Patent: May 5, 2015

(54) SYSTEM AND METHOD FOR REDUCING HANDOVER OCCURRENCES IN A WIRELESS COMMUNICATION NETWORK

(71) Applicant: Fujitsu Limited, Kawasaki-shi, Kanagawa (JP)

(72) Inventor: Shoichiro Ebesu, Yokohama (JP)

(73) Assignee: Fujitsu Limited, Kawasaki (JP)

(*) Notice: Subject to any disclaimer, the term of this patent is extended or adjusted under 35 U.S.C. 154(b) by 204 days.

(21) Appl. No.: 13/762,087

(22) Filed: Feb. 7, 2013

(65) Prior Publication Data

US 2013/0242941 A1 Sep. 19, 2013

(30) Foreign Application Priority Data

Mar. 19, 2012 (JP) ................................. 2012-062179

(51) Int. Cl.
*H04W 36/00* (2009.01)
*H04W 36/24* (2009.01)
*H04W 36/32* (2009.01)

(52) U.S. Cl.
CPC ............ *H04W 36/00* (2013.01); *H04W 36/245* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 6,349,208 B1* | 2/2002 | Sexton et al. | 455/439 |
| 2009/0111499 A1* | 4/2009 | Bosch et al. | 455/522 |
| 2010/0020764 A1 | 1/2010 | Yamamoto et al. | |
| 2010/0041404 A1* | 2/2010 | Kim et al. | 455/436 |
| 2013/0045749 A1* | 2/2013 | Sridhar et al. | 455/443 |

FOREIGN PATENT DOCUMENTS

| | | |
|---|---|---|
| JP | 2010-034789 A | 2/2010 |
| JP | 2010-187075 A | 8/2010 |

* cited by examiner

*Primary Examiner* — Chi H Pham
*Assistant Examiner* — Shick Hom
(74) *Attorney, Agent, or Firm* — Arent Fox LLP

(57) ABSTRACT

A first base station wirelessly communicates with a terminal. A second base station predicts a handover interval based on handover history information upon receiving from the first base station a handover request for performing a handover of the terminal to the second base station, where the handover interval indicates a time period from a first handover time at which a first handover of the terminal is performed from the first base station to the second base station, to a second handover time at which a second handover of the terminal is performed from the second base station to another base station, and the handover history information indicates a history of handovers that have been performed by the second base station. Then, the second base station determines whether a handover of the terminal to the second base station is permitted or not, based on the predicted handover interval.

16 Claims, 16 Drawing Sheets

FIG. 7

| LATITUDE | LONGITUDE | ALTITUDE | SPEED | BEARING | NUMBER OF HO OPERATIONS (BELOW T) | NUMBER OF HO OPERATIONS (ABOVE T) |
|---|---|---|---|---|---|---|
| POINT A | POINT A | POINT A | 4 | 1 | 10 | 95 |
| POINT A | POINT A | POINT A | 4 | 3 | 91 | 9 |
| POINT B | POINT B | POINT B | 2 | 2 | 43 | 44 |
| ... | ... | ... | ... | ... | ... | ... |

| RESOURCE STATUS | RSRP OFFSET (dBm) | RSRQ OFFSET (dB) |
|---|---|---|
| Low | +20 | +10 |
| Middle | 0 | 0 |
| High | -20 | -10 |
| Overload | -50 | -30 |

| RESOURCE STATUS | MeasurementReport | | AFTER CONSIDERATION OF RESOURCE OFFSET | |
|---|---|---|---|---|
| | RSRP (dBm) | RSRQ (dB) | RSRP (dBm) | RSRQ (dB) |
| Cell 1 | -60 | -6 | -60 | -6 |
| Cell 2 | -50 | -5 | -50 + 20 = -30 | -5 + 10 = 5 |
| Cell 3 | -70 | -7 | -70 - 20 = -90 | -7 - 10 = -17 |

FIG. 16

| RESOURCE STATUS | MeasurementReport | | AFTER CONSIDERATION OF NEGATIVE CELLID OFFSET | | AFTER CONSIDERATION OF RESOURCE OFFSET | |
|---|---|---|---|---|---|---|
| | RSRP (dBm) | RSRQ (dB) | RSRP (dBm) | RSRQ (dB) | RSRP (dBm) | RSRQ (dB) |
| Cell 1 | -55 | -2 | -55 | -2 | -55 | -2 |
| Cell 2 | -40 | 0 | -40 - 10 = -50 | 0 - 5 = -5 | -50 + 20 = -30 | -5 + 10 = 5 |
| Cell 3 | -50 | -1 | -50 | -1 | -50 - 20 = -70 | -1 - 10 = -11 |

SYSTEM AND METHOD FOR REDUCING HANDOVER OCCURRENCES IN A WIRELESS COMMUNICATION NETWORK

CROSS-REFERENCE TO RELATED APPLICATION

This application is based upon and claims the benefit of priority of the prior Japanese Patent Application No. 2012-062179, filed on Mar. 19, 2012, the entire contents of which are incorporated herein by reference.

FIELD

The embodiments discussed herein are related to a system and method for reducing handover occurrence in a wireless communication system.

BACKGROUND

Currently, wireless communication systems such as cellular phone systems and wireless local area networks (LANs) are widely used. In the field of wireless communication, discussions on the next generation of communication technologies are being continuously conducted to further improve the transmission speed and communication capacity. For example, in the 3rd Generation Partnership Project (3GPP), which is a standardization organization, a wireless communication system called Long Term Evolution-Advanced (LTE-A), which has been developed from Long Term Evolution (LTE), has been proposed.

There is a technique called a handover in the field of wireless communication as mentioned. A handover is, for example, a technique for switching a radio base station device (evolved UTRAN NodeB (eNB), hereinafter referred to as a "base station") to which a mobile terminal device (mobile station, hereinafter referred to as a "terminal") is communicably coupled. For example, when the intensity of radio waves received by a terminal becomes lower than a fixed value, the terminal changes its connection from the current base station to another by a handover, so that continuous wireless communication is achieved.

In this case, the base station determines whether a handover is to be performed and selects which base station is to be the target of a handover, for example, based on the radio quality detected by the terminal. For example, the terminal measures the intensities of radio waves of signals transmitted from a base station communicably coupled thereto and an adjacent base station located adjacent to the base station communicably coupled, and transmits their respective measurement results to the base station. The base station determines that the adjacent base station is to be the target of the handover when the intensity of radio waves of the adjacent base station is higher than that of the currently coupled base station and is higher than a threshold.

Unfortunately, a plurality of handovers may occur for a short time when the terminal is moving at high speed while performing data communication. Particularly, in urban areas in which the ranges covered by cells (cell ranges) are designed so as to overlap one another by using a plurality of base stations, there are many cases where such a situation occurs compared to other areas.

In these cases, for example, the base station serving as the source of a handover (the handover source) forwards data to a base station serving as the target of the handover (the handover target), and the target base station transmits the data to the terminal. However, since the terminal is moving at high speed, the terminal may be further handed over to another base station while the base station serving as the handover target is transmitting data, and thus the terminal may fail to receive the data. Accordingly, when a plurality of handovers occur for a short time, data loss and retransmission of the data lost are likely to occur.

Techniques concerning handovers are, for example, as follows. That is, in a control device in charge of a plurality of base stations, a frequency of handovers is stored for each permutation in which three base stations are sequentially arranged, the handover target is determined on the basis of that frequency, and the timing of the handover is predicted on the basis of ratio between communications times of the base stations.

Also, in a cell individual offset (CIO) setting control device, a CIO value that is used for correction of a radio quality result measured by a mobile station is corrected on the basis of a cell-stay period of user equipment (UE) that is included in communication history information, and thus the CIO value is set without performing a running test and the like.

Japanese Laid-open Patent Publication No. 2010-34789 and Japanese Laid-open Patent Publication No. 2010-187075 disclose related techniques.

SUMMARY

According to an aspect of the invention, a system for reducing handover occurrences in a wireless communication network is provided. The system includes a terminal, a first base station performing wireless communication with the terminal, and a second base station. The second base station predicts a handover interval based on handover history information upon receiving from the first base station a handover request for performing a handover of the terminal to the second base station, where the handover interval indicates a time period from a first handover time at which a first handover of the terminal is performed from the first base station to the second base station, to a second handover time at which a second handover of the terminal is performed from the second base station to another base station, and the handover history information indicates a history of handovers that have been performed by the second base station. The second base station determines whether a handover of the terminal to the second base station is permitted or not, based on the predicted handover interval.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a handover history information table, according to an embodiment;

FIG. 13 is a diagram illustrating an example of a correspondence table, according to an embodiment;

FIG. 14 is a diagram illustrating an example of radio qualities to which resource offset values are applied, according to an embodiment;

FIG. 16 is a diagram illustrating an example of negative cellid offset values and resource offset values, according to an embodiment.

DESCRIPTION OF EMBODIMENTS

Of the above two techniques concerning handovers, the former technique, in which the control device predicts the handover target based on the frequency of handovers, determines a base station whose frequency of handovers is the highest to be a handover target. Accordingly, when a base station from which a handover to the next target for connection may be performed in a short time is selected as a handover target whose frequency of handovers is the highest, even if the terminal is handed over to the base station, the terminal will be handed over to another base station in a short time.

In such a case, for example, a loss of communication data may occur as mentioned above. Also, in such a case, the amount of communication traffic increases in a radio zone and power consumption increases at the terminal, compared to cases where a handover is performed only once.

In the latter technique, in which a CIO value is corrected, a base station transmits the corrected CIO value to all the mobile stations subordinate thereto. Therefore, all the mobile stations subordinate to the base station share the corrected CIO value with each other.

Accordingly, with such techniques, neither the base station nor the control device is able to control a handover of individual terminals subordinate to the base station, and some terminals may be handed over a plurality of times within a short time.

Moreover, in both of the foregoing two techniques, radio resources (e.g., time and frequency) for use for wireless communication between the base station and the terminal are not taken into consideration. Accordingly, when the terminal moves to the handover target, wireless communication is sometimes unable to be performed because of a shortage of radio resources.

Hereinafter, embodiments for implementing the present disclosure will be described.

First Embodiment

A first embodiment will be described first.

Figure 1:
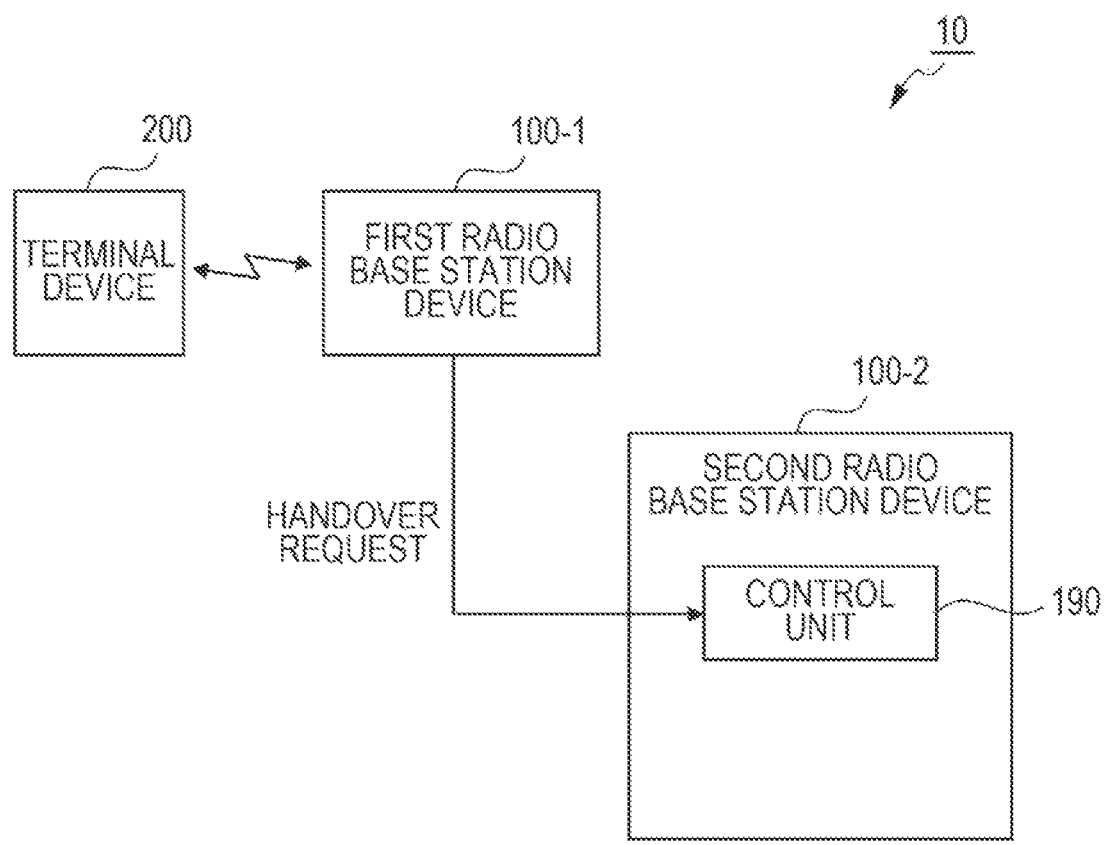
FIG. 1 is a diagram illustrating a configuration example of a wireless communication system, according to a first embodiment.

FIG. 1 is a diagram illustrating a configuration example of a wireless communication system, according to a first embodiment. The wireless communication system 10 includes first and second radio base station devices 100-1 and 100-2 and a terminal device 200.

The first and second radio base station devices 100-1 and 100-2 are able to wirelessly communicate with the terminal device 200. In the example of FIG. 1, the first radio base station device 100-1 and the terminal device 200 wirelessly communicate with each other.

The first radio base station device 100-1 transmits, to the second radio base station device 100-2, a handover request for performing a handover of the terminal device 200.

For example, the terminal device 200 measures first radio quality for the first radio base station device 100-1 and second radio quality for the second radio base station device 100-2, and transmits, to the first radio base station device 100-1, the result of measurements indicating that the second radio quality is better than the first radio quality. The first radio base station device 100-1 transmits a handover request to the second radio base station device 100-2, for example, upon receiving the result of measurements from the terminal device 200.

The second radio base station device 100-2 includes a control unit 190. The control unit 190 receives the handover request transmitted from the first radio base station device 100-1. In response to the handover request, the control unit 190 predicts a prediction time-period indicating a time period from a first time at which the terminal device 200 is handed over to the second radio base station device 100-2 to a second time at which the next handover of the terminal device 200 is performed, on the basis of history information indicating a history of handovers that have been performed by the second radio base station device 100-2. Then, based on the prediction time-period, the control unit 190 determines whether to permit the terminal device 200 to be handed over to the second radio base station device 100-2.

For example, when the predicted time-period is shorter than a first threshold value, the control unit 190 determines that the terminal device 200 is not permitted to be handed over to the second radio base station device 100-2.

In this case, for example, the first radio base station device 100-1 determines to perform a handover to a third radio base station device (not illustrated), and transmits the handover request of the terminal device 200 to the third radio base station device.

Accordingly, when the control unit 190 determines that the terminal device 200 is not permitted to be handed over to the second radio base station device 100-2, for example, the terminal device 200 will not be handed over to the second radio base station device 100-2. Thus, in this wireless communication system, the frequency of handovers is decreased compared to the case where handover to the second radio base station device 100-2 is performed.

In the first radio base station device 100-1, the handover target is determined, based on a determination made by the control unit 190 in the second radio base station device 100-2 and based on the radio resource statuses of the second radio base station device 100-2 and the third radio base station device (not illustrated).

In this way, since the first radio base station device 100-1 takes into consideration the radio resource status in a radio base station device as the handover target when determining a handover target, it is possible to avoid a situation where wireless communication is not performed because of a shortage of radio resources in the handover target. This allows the terminal device 200 to perform a wireless communication via the handover target.

Second Embodiment

Exemplary Overall Configuration

A second embodiment will be described next.

Figure 2:
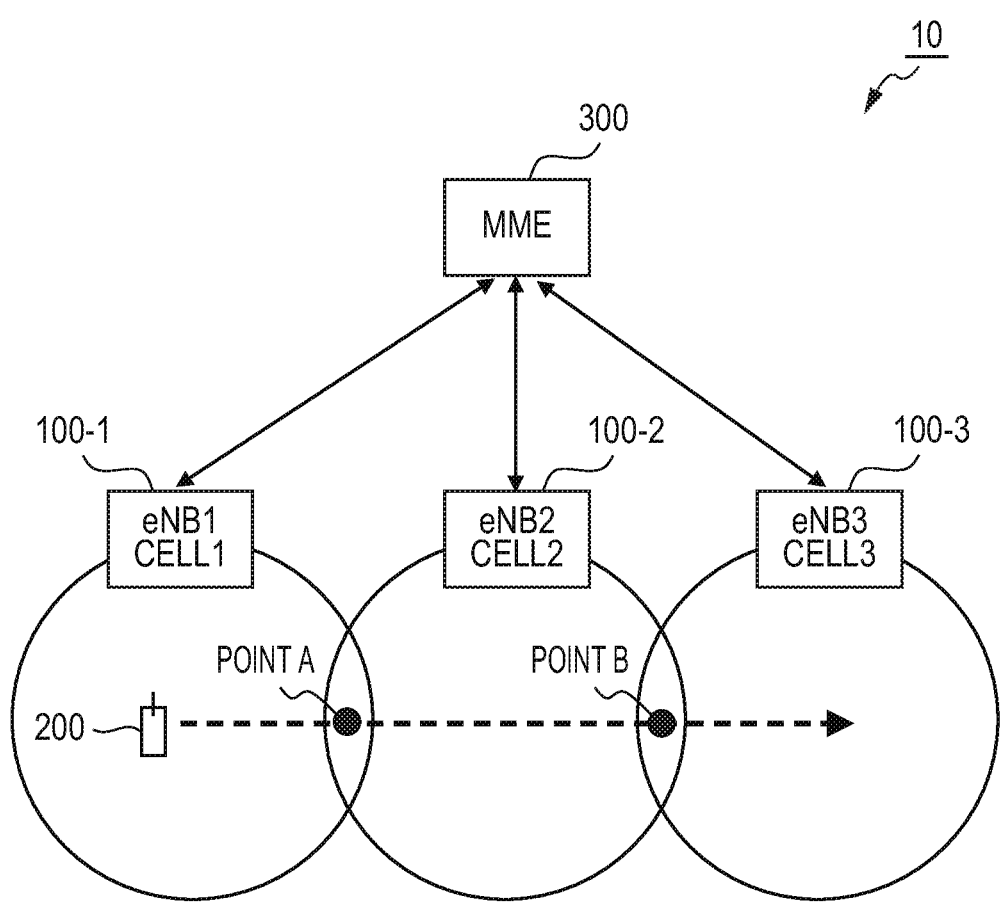
FIG. 2 is a diagram illustrating a configuration example of a wireless communication system, according to a second embodiment.

FIG. 2 is a diagram illustrating a configuration example of a wireless communication system, according to a second embodiment. The wireless communication system 10 includes radio base station devices (hereinafter referred to as "base stations") 100-1 to 100-3, a mobile terminal (or a terminal device, hereinafter referred to as a "terminal") 200, and a mobility management entity (MME) 300.

The correspondence relationship with the wireless communication system 10 in the first embodiment is as follows, for example. That is, the first and second radio base station devices 100-1 and 100-2 in the first embodiment correspond to the base stations 100-1 and 100-2 in the second embodiment, respectively. The terminal device 200 in the first embodiment corresponds to the terminal device 200 in the second embodiment.

In the example of FIG. 2, a manner in which the terminal 200 moves from the cell range of the base station 100-1 through the cell range of the base station 100-2 to the cell range of the base station 100-3 is illustrated. The terminal 200 is able to wirelessly communicate with the base stations 100-1 to 100-3 in the cell ranges of the base stations 100-1 to 100-3, respectively.

In the example of FIG. 2, the cell ranges of the base station 100-1 and the base station 100-2 overlap, and the cell ranges of the base station 100-2 and the base station 100-3 also overlap. In the case of such cell ranges, for example, when the terminal 200 is moving in the direction indicated by the arrow in FIG. 2, a point A is a point beyond which the radio quality between the terminal 200 and the base station 100-2 becomes better than the radio quality between the terminal 200 and the base station 100-1. A point B is a point beyond which the radio quality between the terminal 200 and the base station 100-3 becomes better than the radio quality between the terminal 200 and the base station 100-2.

Note that, although each of the base stations 100-1 to 100-3 is actually located at the center of its cell range, in FIG. 2, each of the base stations 100-1 to 100-3 is depicted as being arranged at an end of its cell range, for ease of explanation. Also, although the three base stations 100-1 to 100-3 are included in the wireless communication system 10 in FIG. 2, the number of base stations is not limited to this. Two base stations or four or more base stations may be included in the wireless communication system 10. Also, there may be a plurality of terminals 200.

The MME 300 is wired to each of the base stations 100-1 to 100-3, and performs management, control, and other functions for registration of positions of the terminal 200 and for handovers among the base stations 100-1 to 100-3.

Note that, for example, in LTE, the term "cell" is, for example, defined as a unit for the frequency (or each carrier) used within a sector that is a range (or a coverage) in which wireless communication is able to be performed by using one antenna of the base station 100-1.

For example, in cases where the base station 100-1 has a plurality of antennas (e.g., six antennas) and the physical range in which communication is able to be performed with each antenna is referred to as a "sector", when a plurality of frequencies are used in each sector, frequencies each used in a different sector and having the same frequency value are combined to form a "cell".

However, in embodiments described below including this embodiment, it is assumed that a "cell" means a range in which wireless communication is able to be performed with each of the base stations 100-1 to 100-3. In this case, a unit in which a plurality of "sectors" are combined together is used as a "cell". Of course, a "cell" as defined in LTE and the like may be also embodied in embodiments described below including this embodiment.

Hereinafter, the cell range of the base station 100-1, the cell range of the base station 100-2, and the cell range of the base station 100-3 will be also referred to as a "cell 1", "cell 2", and "cell 3", respectively, for ease of explanation. In FIG. 2, the cell ranges of the base station 100-1 to 100-3 are denoted by "cell 1" to "cell 3", respectively.

However, such a cell range (such as "cell 1") may be used to refer to the radio quality between the terminal 200 and the base station 100 located in the cell range. For example, "Cell 1" in FIG. 16 represents the radio quality between the base station 100-1 and the terminal 200.

<Exemplary Configuration of Radio Base Station Device>

Next, an exemplary configuration of the base station 100 will be described. Note that although three base stations 100-1 to 100-3 are illustrated by way of example in FIG. 2, the base stations 100-1 to 100-3 all have the same configuration and each will be described as the base station 100 unless otherwise noted.

Figure 3:
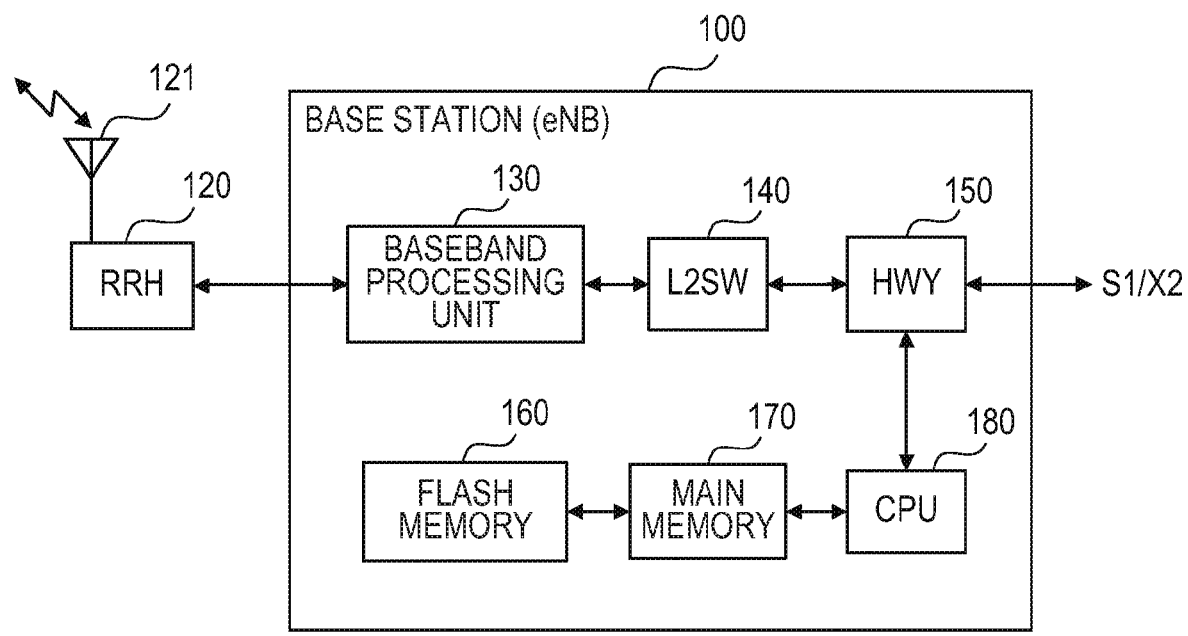
FIG. 3 is a diagram illustrating a configuration example of a base station, according to a second embodiment.

FIG. 3 is a diagram illustrating a configuration example of a base station, according to a second embodiment. FIG. 3 illustrates an exemplary configuration of hardware blocks of a base station 100.

The base station 100 includes a baseband processing unit 130, an L2 switch (L2SW) 140, and a highway (HWY) 150, a flash memory 160, a main memory 170, and a central processing unit (CPU) 180. The base station 100 is connected to a remote radio head (RRH) 120, and transmits radio signals to the terminal 200 and receives radio signals transmitted from the terminal 200 via the RRH 120 and an antenna 121.

Here, the correspondence relationship with the second radio base station device 100-2 in the first embodiment is as follows, for example. That is, the control unit 190 in the first embodiment corresponds to the CPU 180 in this second embodiment.

For example, the RRH 120 amplifies radio signals output from the baseband processing unit 130 and outputs them to the antenna 121, and amplifies radio signals received at the antenna 121 and outputs them to the baseband processing unit 130. The RRH 120 may be configured to include an amplifier circuit inside thereof so as to perform such processing. Note that the RRH 120 may be provided, for example, for each antenna 121.

The baseband processing unit 130 applies, for example, frequency conversion processing, demodulation processing, error correction decoding processing, and other processing to radio signals output from the RRH 120 to convert them into baseband signals. Then, the baseband processing unit 130 converts the converted baseband signals into packet data in a given form and outputs it to the L2SW 140. Also, the baseband processing unit 130 extracts baseband signals from packet data output from the L2SW 140, and applies error correction coding processing, modulation processing, frequency conversion processing, and other processing to the baseband signals to convert them into radio signals. The baseband processing unit 130 outputs the converted radio signals to the RRH 120. In order to perform such processing, the baseband processing unit 130 may be configured to include, for example, a frequency conversion circuit, a demodulation and modulation circuit, an error correction decoding and coding circuit, and other circuits.

The L2SW 140 is, for example, a switch for performing a relay operation on the basis of a media access control (MAC) address contained in packet data. For example, the L2SW 140 outputs, to the HWY 150, packet data output from the baseband processing unit 130, and determines whether packet data output from the HWY 150 is addressed to the radio base station device 100. For example, when a MAC address contained in the packet data output from the HWY 150 is not addressed to the radio base station device 100, then the L2SW 140 may terminate that packet data.

The HWY 150, for example, identifies a transmission destination to which data is to be transmitted from the base station 100, and transmits the data and a message to the identified destination. For example, the HWY 150 is capable of identifying a transmission destination from the MAC header of data output from the L2SW 140 or the CPU 180, and transmitting the data to the transmission destination. In the embodiments described below including this second embodiment, a transmission destination may be the MME 300 or another base station (when the base station 100 is the base station 100-1, the base station 100-2 or the base station 100-3 is another base station). The HWY 150 receives data transmitted from the MME 300 or another base station, and outputs them to the CPU 180 or the L2SW 140.

The flash memory 160 stores parameter values that may be set, for example, by an operator. Such parameter values are suitably read by the CPU 180, for example, when the base station 100 starts up. In FIG. 3, the flash memory 160 is connected via the main memory 170 to the CPU 180. The flash memory 160 may be connected directly to the CPU 180, not via the main memory 170.

The main memory 170 stores, for example, call information and a handover history information table. The details of the call information and handover history information table will be described later.

The CPU 180, for example, generates call information and a handover history information table and determines whether to permit a handover to be performed, and further identifies the handover target. The details of processing performed by the CPU 180 will be described later.

<Exemplary Configuration of Mobile Terminal Device>

Next, an exemplary configuration of the terminal 200 will be described.

Figure 4:
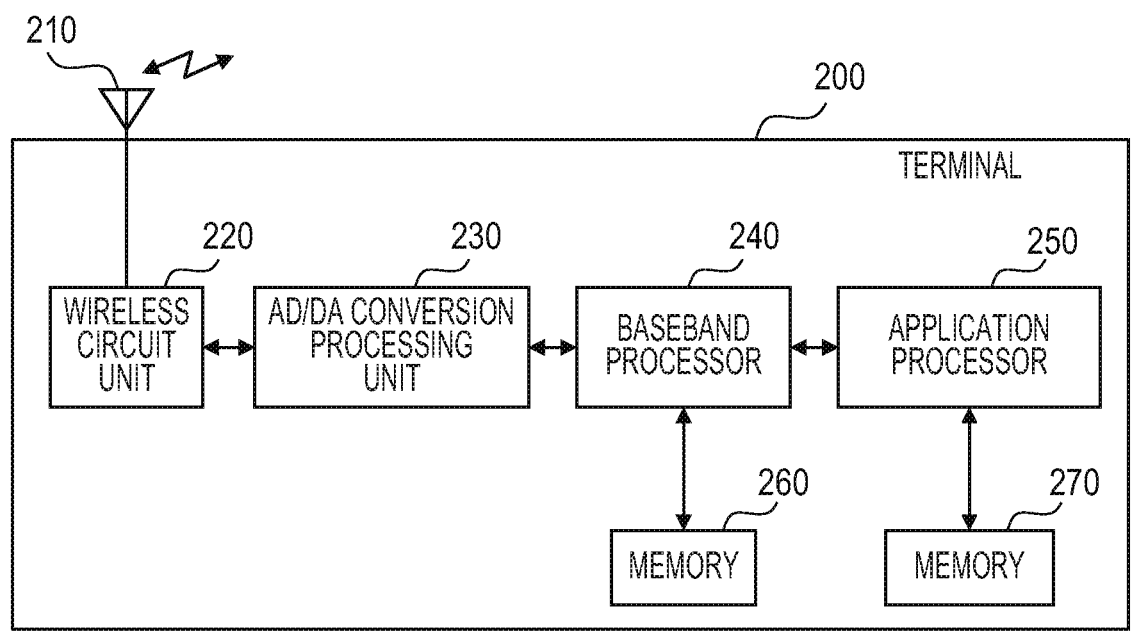
FIG. 4 is a diagram illustrating a configuration example of a terminal, according to an embodiment.

FIG. 4 is a diagram illustrating a configuration example of a terminal, according to an embodiment, FIG. 4 illustrates an exemplary configuration of hardware blocks of the terminal 200.

The terminal 200 may be configured to include an antenna 210, a wireless circuit unit 220, an analog-to-digital/digital-to-analog (AD/DA) conversion processing unit 230, a baseband processor 240, an application processor 250, and memories 260 and 270.

The wireless circuit unit 220 amplifies radio signals from the base station 100 that have been received at the antenna 210 and outputs them to the AD/DA conversion processing unit 230, and also amplifies analog radio signals output from the AD/DA conversion processing unit 230 and outputs them to the antenna 210. Therefore, the wireless circuit unit 220 may be configured to include an amplifier circuit.

The AD/DA conversion processing unit 230 converts analog radio signals output from the wireless circuit unit 220 to digital radio signals. The AD/DA conversion processing unit 230 converts digital radio signals output from the baseband processor 240 to analog radio signals.

The baseband processor 240 applies frequency conversion processing, demodulation processing, error correction decoding processing, and other processing to radio signals output from the AD/DA conversion processing unit 230 to convert them to baseband signals, and outputs the converted baseband signals to the application processor 250. Also, the baseband processor 240 applies error correction coding processing, modulation processing, frequency conversion processing, and other processing to data output from the application processor 250 to convert them to radio signals, and outputs the converted radio signals to the AD/DA conversion processing unit 230. The baseband processor 240 performs such processing by appropriately accessing the memory 260 and storing, in the memory 260, numerical values that indicate the result obtained during the processing or after the processing.

Note that the terminal 200 is configured to measure the radio quality, such as reference signal received quality (RSRQ) or reference signal received power (RSRP), in a radio zone between the terminal 200 and the base station 100, and to inform the base station 100 of the measurement result contained in MeasurementReport. For example, such measurement of radio quality and generation of MeasurementReport is performed by the baseband processor 240.

The application processor 250 performs, for example, various types of application processing. The application processor 250 may be, for example, configured to apply image processing, sound processing, and other processing, to baseband signals output from the baseband processor 240, so that an image is displayed on a monitor (not illustrated) and a sound is output from a microphone (not illustrated). The application processor 250 may apply image processing to an image captured by a camera (not illustrated) in the terminal 200 and output the image as image data to the baseband processor 240. The application processor 250 may also measure the position (e.g., latitude, longitude, and altitude) of the terminal 200, for example, by executing a global positioning system (GPS) application and exchanging signals with a satellite.

<Exemplary Operations>

Exemplary operations of the wireless communication system 10 configured in such a manner will be described next. In the wireless communication system 10, the base station 100 generates a handover history information table and controls handover with reference to the generated handover history information table. Accordingly, as exemplary operations, generation of a handover history information table will be described first, and then handover control will be described.

<Generation of Handover Information Table>

Figure 5:
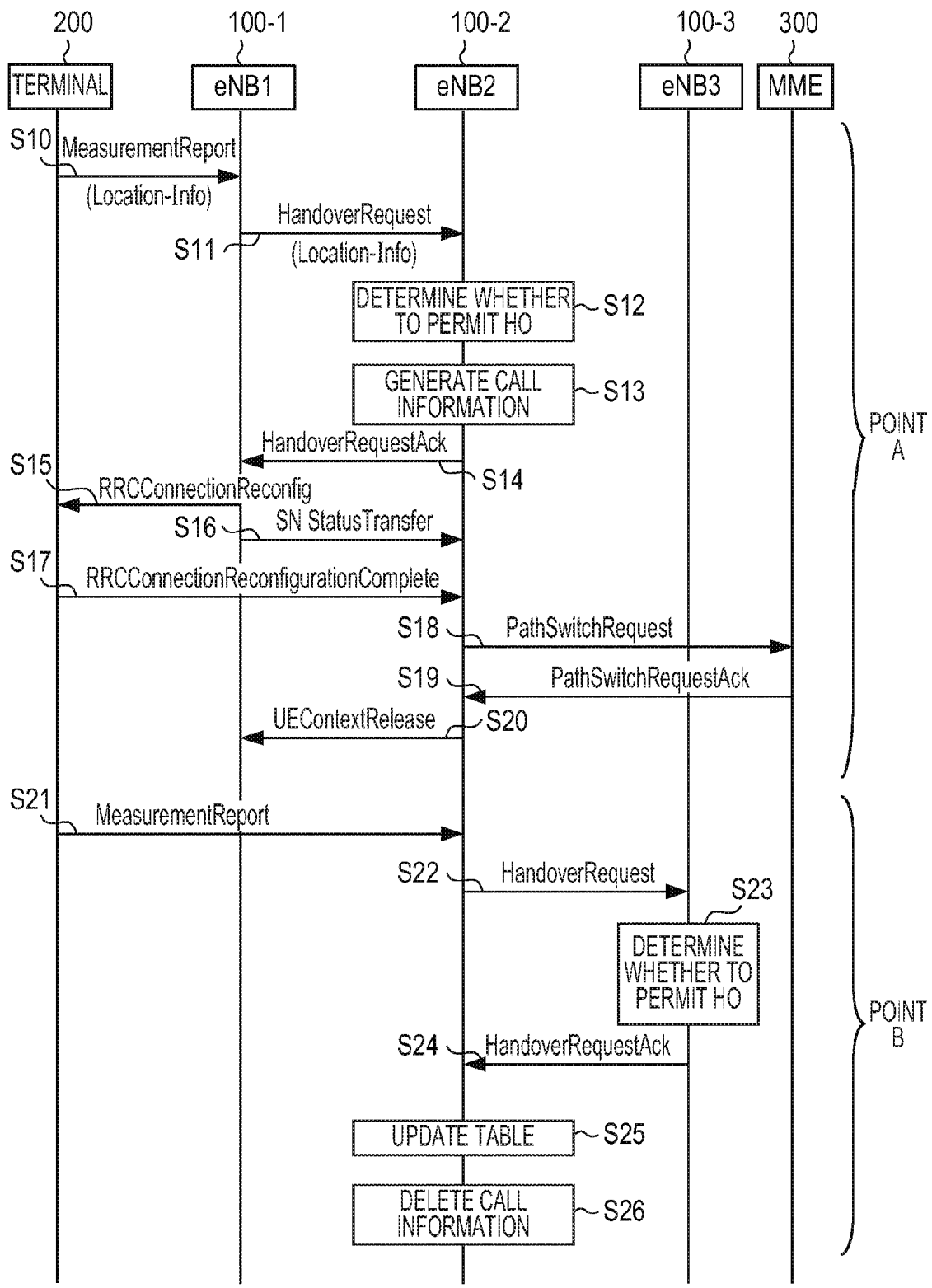
FIG. 5 is a diagram illustrating an example of an operational sequence of a wireless communication system, according to an embodiment.

FIG. 5 is a diagram illustrating an example of an operational sequence of a wireless communication system, according to an embodiment. FIG. 5 illustrates an exemplary operational sequence of the entire wireless communication system 10 when a handover history information table is generated in the base station 100-2. As an exemplary operational sequence, an example of the case where the terminal 200 moves from the point A to the point B as illustrated in FIG. 2 is described.

In operation S10, upon moving to the point A, the terminal 200 transmits MeasurementReport to the base station 100-1. For example, the baseband processor 240 measures radio qualities for radio signals received from the two base stations 100-1 and 100-2, generates MeasurementReport including the radio qualities obtained by the measurements, and transmits the generated MeasurementReport. In this case, assuming that the radio quality between the base station 1004 and the terminal 200 is "cell 1" and the radio quality between the base station 100-2 and the terminal 200 is "cell 2", they are in a state of "cell 1<cell 2".

At this time, the terminal 200 transmits MeasurementReport including Location-Info to the base station 100-1. Location-Info is, for example, one of information elements included in MeasurementReport, where the information elements include information on the position, speed, and bearing (direction in which the terminal 200 is moving) of the terminal 200. Location-Info is, for example, defined in "3GPP TS 36.331 Rel10".

The terminal 200 may acquire the position information thereof (e.g., latitude, longitude, and altitude) by using a GPS or the like, and may acquire information on speed and bearing, for example, from displacement of the acquired position information. For example, the application processor 250 acquires information on the position, speed, and bearing for the terminal 200. The baseband processor 240 may generates MeasurementReport including Location-Info by receiving the information acquired by the application processor 250.

In operation S11, upon receiving MeasurementReport, the base station 100-1 transmits HandoverRequest to the base station 100-2 in response to the fact that "cell 1<cell 2" in terms of radio quality. For example, the CPU 180 of the base station 100-1 receives MeasurementReport via the baseband processing unit 130, reads out the radio qualities, and conforms that "cell 1<cell 2" in terms of the radio quality. Then, the CPU 180 generates HandoverRequest and transmits the generated HandoverRequest via the HWY 150 to the base station 100-2.

In this case, the base station 100-1 transmits HandoverRequest including Location-Info to the base station 100-2. For example, the CPU 180 extracts Location-Info from MeasurementReport and generates the HandoverRequest including the extracted Location-Info.

In operation S12, upon receiving HandoverRequest, the base station 100-2 determines whether to permit a handover. For example, when the receiving quality "cell 2" of the base station 100-2 included in HandoverRequest is equal to or greater than a threshold value, the base station 100-2 may determine that a handover is permitted. Such a determination is made, for example, by the CPU 180.

In operation S13, when the base station 100-2 has determined that a handover is permitted, the base station 100-2 generates call information.

Figure 6:
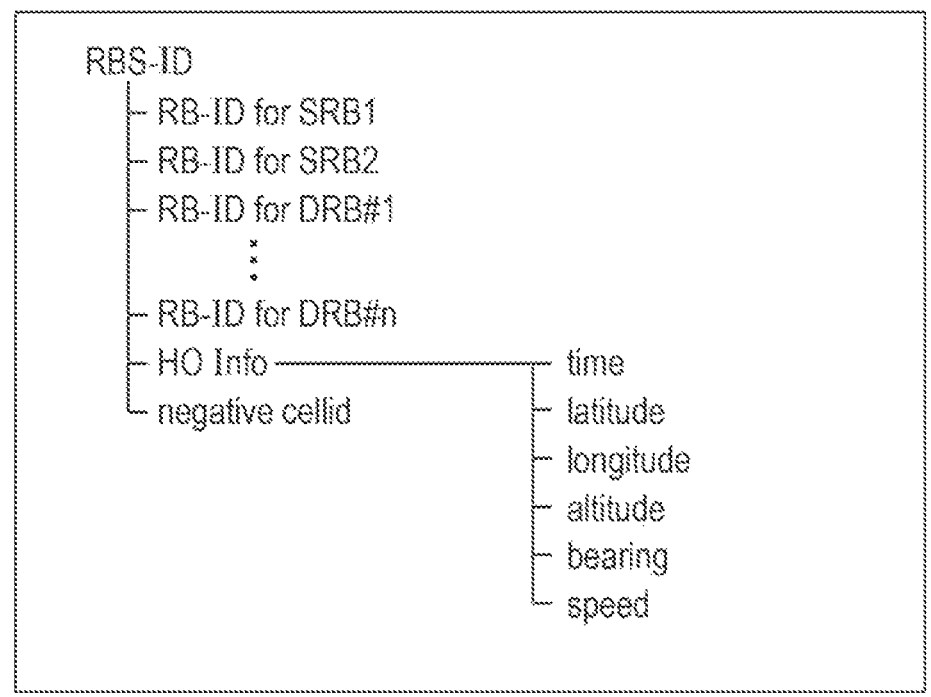
FIG. 6 is a diagram illustrating an example of call information, according to an embodiment.

FIG. 6 is a diagram illustrating an example of call information, according to an embodiment. Call information may be configured to include information items "radio base station-identification (RBS-ID: ID of a radio base station)", "radio bearer-ID for signaling radio bearer (RB-ID for SRB: ID of a signaling radio bearer)", and "radio bearer-ID for data radio bearer (RB-ID for DRB: ID of a data radio bearer)".

For example, the CPU 180 sets a communication connection using a radio bearer in response to data or a signal, and generates the above information items by providing the set radio bearer with ID.

"HO Info" and "negative cellid" may be further included in call information.

Information on "time", "latitude", "longitude", "altitude", "bearing", and "speed" is included in "HO Info". Among these items, "latitude", "longitude", "altitude", "bearing", and "speed" are information included in Location-Info, and the base station 100-2 is able to extract these information items from Location-Info. Also, "time" may be defined, for example, as a time of day at which the base station 100-2 receives HandoverRequest in operation S11.

For example, upon receiving HandoverRequest in operation S11, the CPU 180 extracts Location-Info to extract information on the position (latitude, longitude, and altitude), bearing, and speed of the terminal 200. Then, the CPU 180 may generate call information by setting the latitude, longitude, altitude, bearing, and speed included in Location-info as "latitude", "longitude", "altitude", "bearing", and "speed" of the call information, respectively.

Note that "latitude" and "longitude" are rounded down, for example, to four decimal places. Also, "speed" is evaluated on a numerical scale of "1" to "5", and "bearing" is evaluated on an eight-level scale, the east, west, south, north, northwest, northeast, southwest, and southeast, which correspond to numerical values of "1" to "8", respectively.

In this way, the base station 100-2 is able to generate call information. For example, the CPU 180 stores the generated call information in the main memory 170.

Note that, among information items included in call information, "negative cellid" will be described later.

Referring back to FIG. 5, in operation S13, the base station 100-2 generates call information.

In operation S14, the base station 100-2 transmits HandoverRequestAck to the base station 100-1. For example, upon generating call information, the CPU 180 generates HandoverRequestAck and transmits it via the HWY 150 to the base station 100-1.

In operation S15, the base station 100-1, which has received HandoverRequestAck, instructs the terminal 200 of RRCConnectionReconfiguration. Thereby, the terminal 200 recognizes that a handover to the base station 100-2 is permitted.

Thereafter, in operations S16 to S20, for example, a handover procedure specified in LTE may be followed.

Then, as illustrated in FIG. 2, the terminal 200 moves to the point B.

The following operations are performed when the terminal 200 moves to the point B.

In operation S21, the terminal 200 reports MeasurementReport to the base station 100-2. MeasurementReport in this case indicates that radio qualities are in a state of "cell 2<cell 3" where "cell 2" is the radio quality between the base station 100-2 and the terminal 200 and "cell 3" is the radio quality between the base station 100-3 and the terminal 200.

In operation S22, in response to the fact that "cell 2<cell 3" in terms of radio quality, the base station 100-2 transmits HandoverRequest to the base station 100-3.

In operation S22, the base station 100-3 determines whether to permit handover. The base station 100-3 may determine whether to permit a handover, for example, in a similar manner to that in operation 512.

In operation S22, when the base station 100-3 has determined that a handover is permitted, the base station 100-3 transmits HandoverRequestAck to the base station 100-2.

In operation S25, the base station 100-2 accepts HandoverRequestAck from the base station 100-3 and updates the handover history information table.

FIG. 7 is a diagram illustrating an example of a handover history information table, according to an embodiment. A handover history information table 171 includes information on "latitude", "longitude", "altitude", "speed", "bearing", "the number of HO operations (below T)", and "the number of HO operations (above T)".

"Latitude", "longitude", "altitude", "speed", and "bearing" correspond to "latitude", "longitude", "altitude", "speed", and "bearing" of "HO Info" included in call information, respectively. The base station 100-2 selects, as a row to be updated, a row whose "latitude", "longitude", "altitude", "speed", and "bearing" match the corresponding ones of the generated call information from among rows of the handover history information table 171.

For example, the CPU 180 reads out the handover history information table 171 stored in the main memory 170, and selects, as a row to be updated, a row of the handover history information table 171 whose information items correspond to information items included in "HO Info" of the call information generated in operation S13. For example, the CPU 180 selects the highest row of the handover history information table 171 as a row to be updated when "latitude", "longitude", "altitude", "speed", and "bearing" among call information, are "point A", "point A", "point A", "4", and "1", respectively.

Then, the base station 100-2 determines a time lag of a handover between the point A and the point B. For example, in FIG. 5, the base station 100-2 determines a time lag from accepting HandoverRequest from the base station 100-1 in operation S11 to receiving HandoverRequestAck in operation S24.

The base station 100-2 compares the determined time lag to a "short time period T" set in advance by an operator. The base station 100-2 increments (or counts) "the number of HO operations (below T)" in the handover history information table 171 when the time lag is shorter than the "short time period T". The base station 100-2 increments (or counts) the value of "the number of HO operations (above T)" in the handover history information table 171 when the time lag is equal to or more than the "short time period T".

For example, the CPU 180 increments the value of "the number of HO operations (below T)" in the highest row of the handover history information table 171 illustrated in FIG. 7 when the time lag is shorter than "T", and increments the value of "the number of HO operations (above T)" when the time lag is equal to or more than "T".

Referring back to FIG. 5, in operation S25, the base station 100-2 updates the handover history information table 171.

In operation S26, the base station 100-2 deletes the call information generated in operation S25. This is because the call information is used for updating (or generation) of the handover history information table 171 and is not used after updating the handover history information table 171. For example, the CPU 180 removes the call information stored in the main memory 170 from the main memory 170. However, the CPU 180 does not remove "negative cellid", among the call information, from the main memory 170, and keeps "negative cellid" stored in the main memory 170. This is because "negative cellid" is used in the operations of a base sequence that will be described later.

In this way, the base station 100-2 may update (generate) the handover history information table 171. For example, the handover history information table 171 may be stored in the main memory 170 of the base station 100, and be updated (or generated) by the CPU 180.

<Exemplary Operations of Base Sequence>

Next, an exemplary operational sequence of handover control using the handover history information table 171 will be described. Such an exemplary operational sequence may be referred to as a "base sequence", for example, in this second embodiment.

Figure 8:
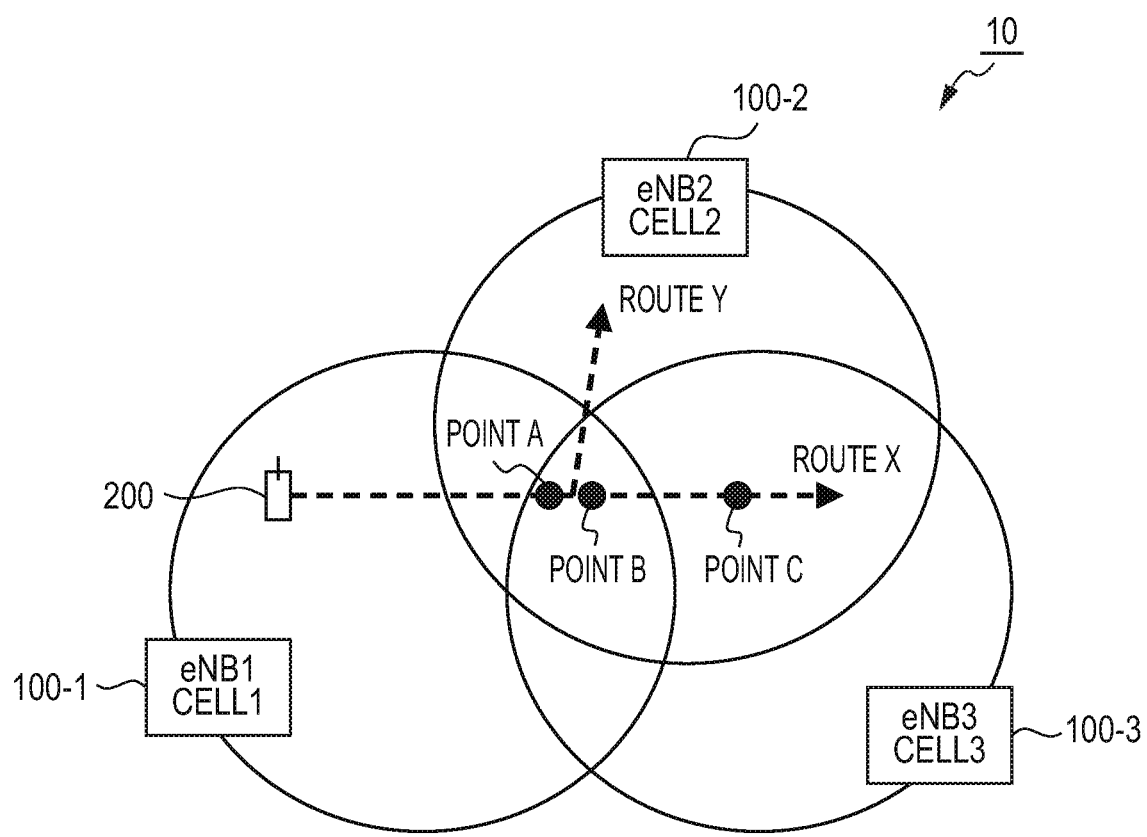
FIG. 8 is a schematic diagram illustrating an example of a manner in which a terminal is handed over in a wireless communication system, according to an embodiment.

FIG. 8 is a schematic diagram illustrating an example of a manner in which a terminal is handed over in a wireless communication system, according to an embodiment. In the example of FIG. 8, the terminal 200 is handed over in the wireless communication system 10, and FIG. 8 illustrates a route X along which the terminal 200 moves from the point A through the point B to a point C, and a route Y along which the terminal 200 bypasses the point B and moves from the point A towards the center of the base station 100-2.

Note that, assuming that the radio qualities of the base stations 100-1 to 100-3 are "cell 1", "cell 2", and "cell 3", respectively, let the point A be a point at which the radio qualities of the terminal 200 existing in the cell range of the base station 100-1 enter a state of "cell 1<cell 2". Also, let the point B be a point at which the radio qualities of the terminal 200 moving from the point A along the route X enter a state of "cell 1<cell 3<cell 2". Further, let the point C be a point at which the radio qualities of the terminal 200 moving from the point B along the route X enter a state of "cell 2<cell 3".

As exemplary operations of the base sequence, an example of the case where the terminal 200 moves along the route X to the point A and further moves from the point A to the point B is described. Note that it is assumed that the base station 100-2 and the base station 100-3 hold the handover history information table 171 that has been updated. Accordingly, the base stations 100-2 and 100-3 execute this base sequence after performing processing of creating the handover history information table 171 (for example, as illustrated in FIG. 5).

Figure 9:
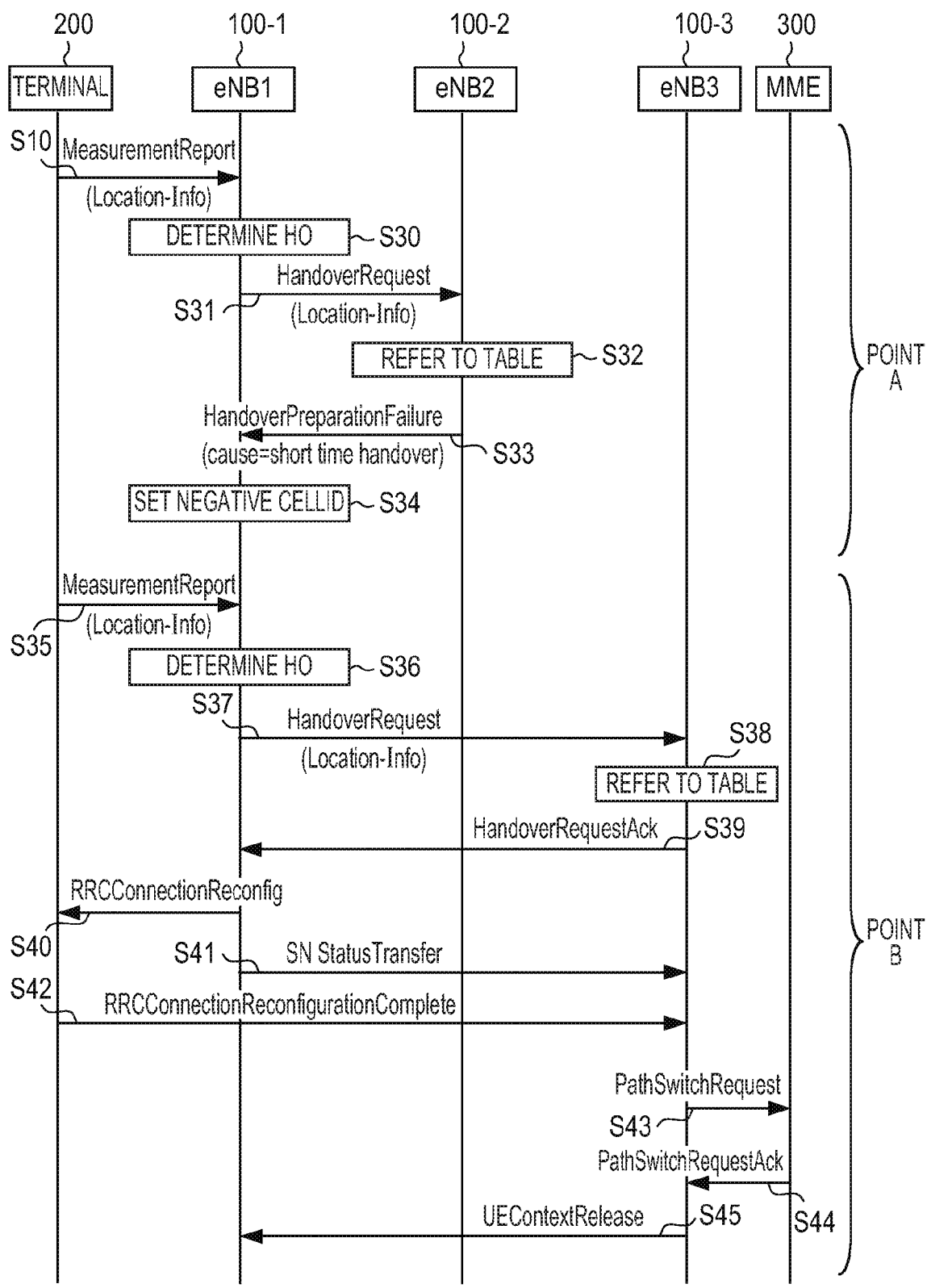
FIG. 9 is a diagram illustrating an example of an operational sequence for a base sequence, according to an embodiment.

FIG. 9 is a diagram illustrating an example of an operational sequence for a base sequence, according to an embodiment.

In operation S10, upon moving to the point A, the terminal 200 transmits MeasurementReport to the base station 100-1. This MeasurementReport includes two radio qualities ("cell 1" and "cell 2") that are in the state of "cell 1<cell 2". The terminal 200 measures information items included in Location-Info ("latitude", "longitude", "altitude", "speed", and "bearing") at the point A, and transmits the MeasurementReport including the measured information items.

In operation S30, upon receiving MeasurementReport, the base station 100-1 determines whether to permit a handover. Since "cell 1<cell 2" is given in terms of the radio qualities, the base station 100-1 determines that a handover to the base station 100-2 is permitted.

In operation S31, the base station 100-1 transmits HandoverRequest to the base station 100-2 where the HandoverRequest includes the Location-Info which has been included in MeasurementReport.

In operation S32, upon receiving HandoverRequest, the base station 100-2 refers to the handover history information table 171.

Figure 10:
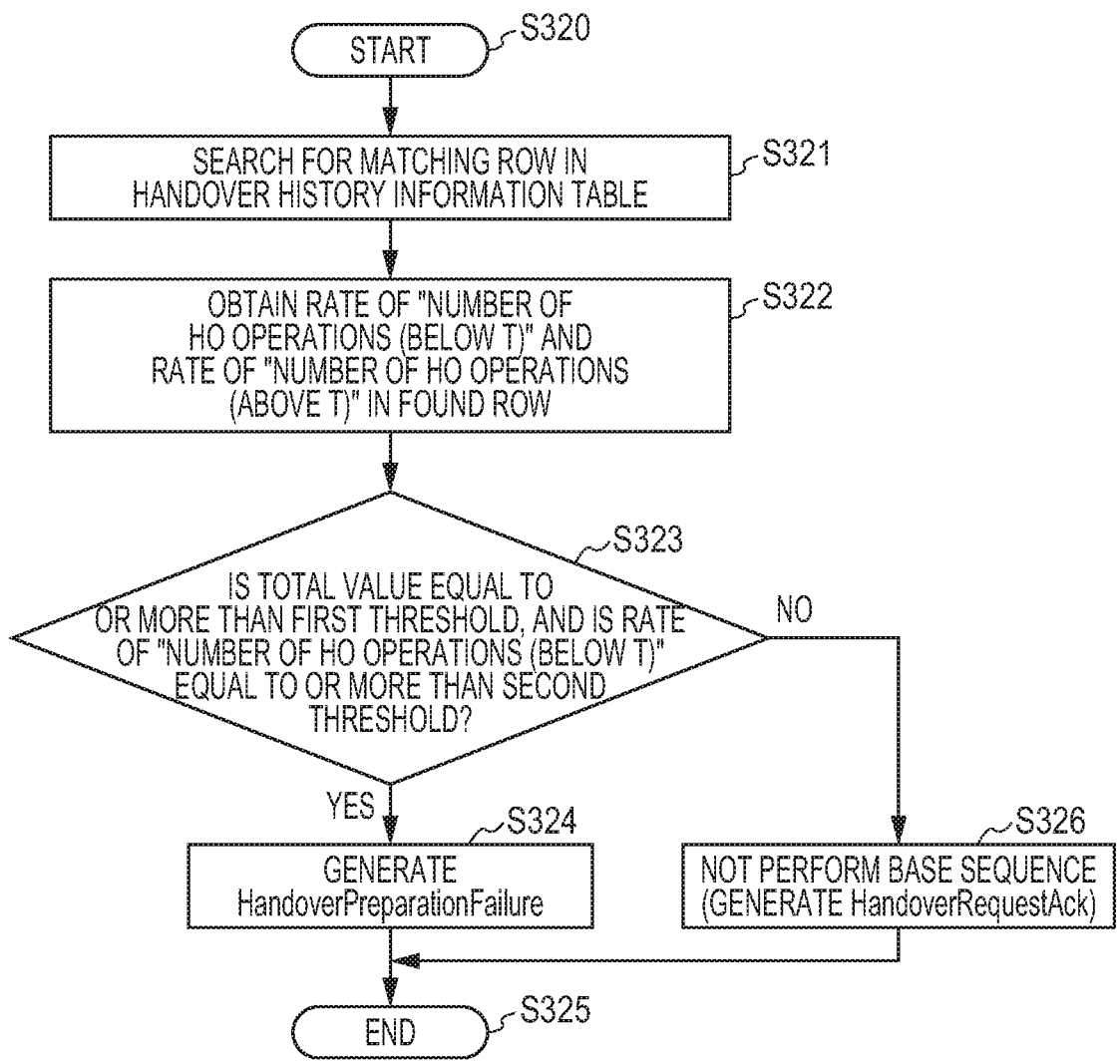
FIG. 10 is a diagram illustrating an example of an operational flowchart for referring to a handover history information table, according to an embodiment.

FIG. 10 is a diagram illustrating an example of an operational flowchart for referring to a handover history information table, according to an embodiment. The operations of FIG. 10 are performed when the base station 100-2 refers to the handover history information table 171 in operation S32.

In operation S320, the base station 100-2 begins processing for referring to a handover history information table.

In operation S321, the base station 100-2 searches for a row matching Location-Info in the handover history information table 171. For example, the CPU 180 reads out the handover history information table 171 stored in the main memory 170, and searches for a row of the handover history information table 171 whose information items "latitude", "longitude", "altitude", "speed", and "bearing" match the corresponding ones included in Location-Info. For example, the CPU 180 finds the highest row in the handover history Information table 171 of FIG. 7 as a row that matches Location-Info.

In operation S322, the base station 100-2 obtains the rate of "the number of HO operations (below T)" and the rate of "The number of HO operations (above T)" in the found row of the handover history information table 171. For example, the CPU 180 obtains the rate of "the number of HO operations (below T)" (10/(10+95) in the case of the highest row in the example of FIG. 7) and the rate of "the number of HO operations (about T)" (95/(10+95) in the case of the highest row in the example of FIG. 7).

In operation S323, the base station 100-2 determines whether the total value of "the number of HO operations (below T)" and "the number of HO operations (above T)" is equal to or more than a first threshold value, and the rate of "the number of HO operations (below T)" is equal to or more than a second threshold value.

In operation S324, the base station 100-2 generates HandoverPreparationFailure when it is determined that the total value of "the number of HO operations (below T)" and "the number of HO operations (above T)" is equal to or more than the first threshold value and the rate of "the number of HO operations (below T)" is equal to or more than the second threshold value (YES in operation S323).

In operation S326, when it is not determined that the total value of "the number of HO operations (below T)" and "the number of HO operations (above T)" is equal to or greater than the first threshold value and the rate of "the number of HO operations (below T)" is equal to or greater than the second threshold (NO in operation S323), the base station 100-2 generates HandoverRequestAck without performing the base sequence.

This is because when the terminal 200 is handed over at the point A, for example, when the rate of "the number of HO operations (below T)" is equal to or greater than the second threshold (Yes in S323), the next handover will be more likely to occur within the time period "T" than after a lapse of "T".

That is, when the terminal 200 is handed over to the base station 100-2 at the point A, the terminal 200 will be more likely to be handed over next within "T" than after a lapse of "T". In such a case, the base station 100-2 does not permit a request for handover of the terminal 200 to the base station 100-2 (in operation S324).

In contrast, for example, assuming that the terminal 200 is handed over to the base station 100-2 at the point A when the rate of "the number of HO operations (below T)" is below the second threshold (No in operation S323), the next handover will be more likely to occur after a lapse of "T" than within "T". In such a case, when the terminal 200 is handed over to the base station 100-2 at the point A, the terminal 200 will be more likely to be handed over next after a lapse of "T" than within "T". Therefore, in operation S326, the base station 100-2 does not perform handover control according to the base sequence in this case, and, for example, permits a handover to the base station 100-2.

Such a determination is, for example, made by the CPU 180 of the base station 100-2.

Note that the reason why a criterion "the total value is equal to or more than the first threshold value" is given for the determination in S323 is that, for example, when a total value of the numbers of "the number of HO operations (below T)" and "the number of HO operations (above T)" is less than the first threshold value, the total value lacks reliability as a population parameter. When the total value is a value that is sufficiently reliable as the population parameter, the base station 100-2 is able to make the determination of operation S323.

Note that, the first threshold value and the second threshold value may be appropriately set by an operator, and the first and second threshold values are stored, for example, in the flash memory 160. The CPU 180 may make the determination of operation S323 by reading out the first threshold value and the second threshold value from the flash memory 160 via the main memory 170 in operation of S323.

In operation S325, the base station 100-2 finishes the operational sequence for the reference process.

Referring back to FIG. 9, in operation S33, the base station 100-2 transmits HandoverPreparationFailure to the base station 100-1, based on the result of determination obtained by referring to the table (in operation S32), where the base station 100-2 sets "short time handover" in an item "cause" of the HandoverPreparationFailure.

In operation S34, upon receiving HandoverPreparationFailure, the base station 100-1 determines that a handover to the base station 100-2 is difficult. Then, the base station 100-1 sets the cell ID of the base station 100-2 that has transmitted HandoverPreparationFailure, to the "negative cellid" held in the main memory 170. Such setting is performed, for example, in such a way that the CPU 180 stores the cell ID of the base station 100-2 as "negative cellid" in the main memory.

Thereafter, the terminal 200 moves from the point A to the point B.

In operation S35, upon moving to the point B, the terminal 200 transmits MeasurementReport to the base station 100-1 since the radio qualities enter the state of "cell 1<cell 3". Note that MeasurementReport includes three radio qualities in the state of "cell 1<cell 3<cell 2".

In operation S36, upon receiving MeasurementReport, the base station 100-1 determines whether to permit a handover. At this time, the base station 100-1 refers to "negative cellid". In this case, since the cell ID of the base station 100-2 is registered as the "negative cellid", the base station 100-1 adds offsets to the radio qualities between the base station 100-1 and the base stations 100-2.

For example, the CPU 180 adds an offset value of "−10 dBm" and an offset value of "−5 dB" to RSRP and RSRQ, respectively, for the base station 100-2 that has been reported from the terminal 200. As a result, the radio qualities are in the state of "cell 2<cell 3". This allows the base station 100-1 to determine that the base station 100-3, not the base station 100-2, is the handover target of the terminal 200.

In operation S37, the base station 100-2 transmits HandoverRequest to the base station 100-3.

In operation S38, the base station 100-3 refers to the handover history information table 171 held therein. In this case, like the process of operation S32, the base station 100-3 performs a reference process (for example, as illustrated in FIG. 10).

When the rate of the number of handover operations that each take a time period below T until the next handover operation is less than the second threshold value (e.g., No in operation S323 of FIG. 10), the base station 100-3 determines that the time period until the next handover is more likely to be equal to or less than "T" than to be more than "T". In this case, the base station 100-3 transmits HandoverRequestAck to the base station 100-1 so as to permit a handover to the base station 100-3 (in operation S39).

In operation S40, upon receiving HandoverRequestAck, the base station 100-1 transmits RRCConnectionReconfiguration to the terminal 200. Thereby, the terminal 200 recognizes that a handover to the base station 100-3 is permitted.

In operations S41 to S45, the terminal 200 and the base station 100-1, as well as the base station 100-3 perform a handover procedure specified, for example, in LTE and the like.

Note that, for example, upon moving to the point C, the terminal 200 provides MeasurementReport of "cell 2<cell 3" to the base station 100-3. However, since the terminal 200 has already been handed over to the base station 100-3, the base station 100-3 and the terminal 200 do not perform a handover procedure. Thus, a handover is not performed when the terminal 200 moves to the point C.

In this way, for example, in FIG. 8, when the terminal 200 moves to the point B, a handover to the base station 100-2 is not performed, and a handover to the base station 100-3 is performed. In this case, the terminal 200 is not handed over at the point C.

For example, when the terminal 200 is moving at high speed from the point A to the point C, the frequency of handovers is only once in this wireless communication system 10 compared to the case where the terminal 200 is handed over to the base stations 100-1, 100-2, and 100-3 sequentially. Accordingly, it is possible in this wireless communication system 10 to reduce the frequency of handovers. In other words, this base sequence allows handover operations to aggregate into the point B.

Particularly, in urban areas and the like, cell ranges are sometimes designed so as to overlap one another by using a plurality of base stations. In cases where the terminal 200 moves at high speed across such cell ranges, this communication system 10 enables the frequency of handovers to be reduced.

In cases where the base sequence is performed at the point A and the point B, processing such as special calculation for a handover is not performed in devices other than the base stations 100-1 to 100-3 and the terminal 200. Accordingly, this base sequence enables processing to be performed simply compared to cases where special calculation for a handover is performed in the other devices, allowing the processing to speed up. This also allows power consumption to be reduced in the terminal 200.

<Exemplary Operations when Deviating from Predicted Route>

Next, exemplary operations performed when the terminal 200 deviates from a predicted route will be described.

In the exemplary operations of the base sequence, the base station 100-2 transmits HandoverPreparationFailure to the base station 100-1 on the basis of the prediction that "the terminal 200 is moving along the route X" (operation S33 in FIG. 9). In reality, the prediction proves inaccurate at a certain rate. For example, there is a case where a user who operates the terminal 200 moves along a route that is not along a road.

For example, the case where the terminal 200 moves along the route Y, not the predicted route X, as illustrated in FIG. 8 is described as an example of operations performed when the terminal 200 deviates from a predicted route.

Figure 11:
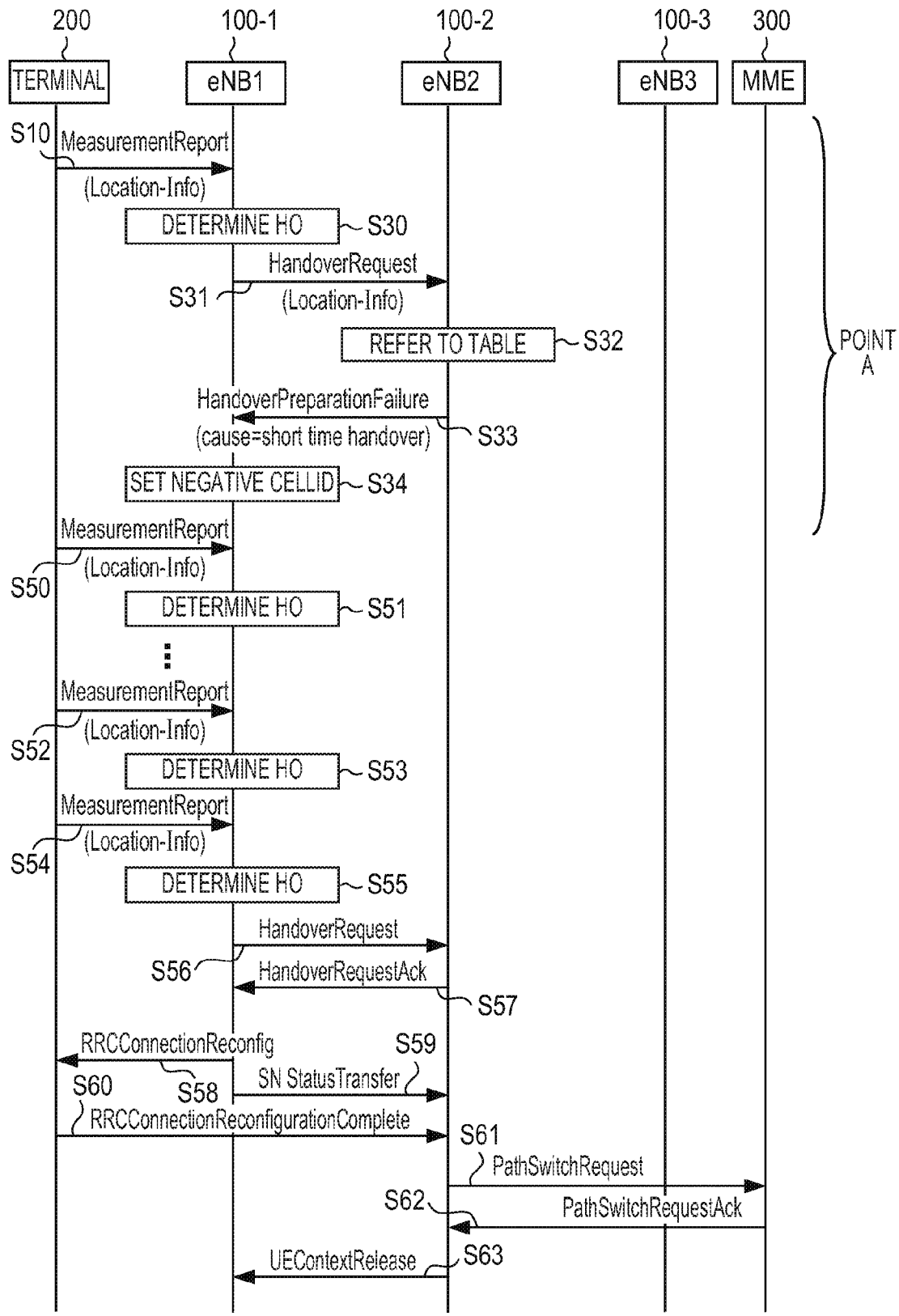
FIG. 11 is a diagram illustrating an example of an operational sequence when a terminal deviates from a predicted route, according to an embodiment.

FIG. 11 is a diagram illustrating an example of an operational sequence when a terminal deviates from a predicted route, according to an embodiment. FIG. 11 illustrates an exemplary operational sequence performed when the terminal 200 moves to the point A and then moves along the route Y without moving to the point B in FIG. 8. The same operations as those of the base sequence (in FIG. 9) are denoted by the same reference characters.

In operation S10, upon moving to the point A, the terminal 200 transmits MeasurementReport to the base station 100-1. This MeasurementReport includes two radio qualities ("cell 1" and "cell 2") in the state of "cell 1<cell 2".

In operation S30, the base station 100-1 determines whether to permit a handover.

In operation S31, the base station 100-1 transmits HandoverRequest to the base station 100-2 when the determination is affirmative.

In operation S32, the base station 100-2 searches the handover history information table 171 using Location-Info added to HandoverRequest as a key. Then, the base station 100-2 determines whether the total value of "the number of handover (HO) operations (below T)" and "the number of HO operations (above T)" in the found row of the handover history information table 171 is equal to or more than the first threshold value, and the rate of "the number of HO operations (below T)" is equal to or more than the second threshold value (for example, as described in operation S323 of FIG. 10). This condition is satisfied in this case (Yes in operation S323 of FIG. 10), and the base station 100-2 transmits HandoverPreparationFailure to the base station 100-1, in operation S33.

In operation S34, the base station 100-1 sets the cell ID of the base station 100-2 to the "negative cellid".

Then, the terminal 200 moves along the route Y from the point A.

Thereafter, the terminal 200, which has reported the quality status using MeasurementReport, reports MeasurementReport at intervals of ReportInterval until the number of reports reaches the value of ReportAmount, unless a handover procedure is started.

It is, however, assumed that, for example, ReportAmount and ReportInterval are informed in advance as notice information from the base station 100-1 to the terminal 200. Therefore, even when moving along the route Y, the terminal 200 reports MeasurementReport to the base station 100-1.

In the example of FIG. 11, while the terminal 200 is moving along with the route Y, the terminal 200 transmits MeasurementReport to the base station 100-1 in operations S50 and S52.

In operations S51 and S53, in response to the report of MeasurementReport, the base station 100-1 determines whether to permit a handover. In this case, the cell ID of the base station 100-2 is set as "negative cellid". Accordingly, an offset value of "−10 dBm" and an offset value of "−5 dB" are added to RSRP and RSRQ for the base station 100-2, respectively. Consequently, when the radio quality "cell 2" for the base station 100-2 is not sufficiently higher than the radio quality "cell 1" for the base station 100-1, "cell 1<cell 2" is not satisfied, and therefore the base station 100-1 does not transmit HandoverRequest to the base station 100-2.

To address this, when the radio quality of the base station 100-1 is lower than a certain level (or lower than a third threshold value), the base station 100-1 determines a handover target without referring to "negative cellid". At this time, the base station 100-1 transmits HandoverRequest without referring to Location-Info added to MeasurementReport which is, for example, reported in operation S50 or S51.

In the example of FIG. 11, in operation S55, it is assumed that the radio quality of the base station 100-1 reported by MeasurementReport (in operation S54) is lower than the third threshold value. In this case, without referring to "negative cellid" (for example, the cell ID of the base station 100-2), the base station 100-1 determines that a handover is permitted. Then, the base station 100-1 does not add offsets with respect to radio qualities, and, as a result, the radio qualities are in the state of "cell 1<cell 2". In this case, in operation S55, the base station 100-1 determines that the handover target is the base station 100-2.

In operation S56, the base station 100-1 transmits HandoverRequest to the base station 100-2. The base station 100-1 transmits HandoverRequest in such a fashion that Location-Info is not included therein. Thereby, the base station 100-2 controls a handover without referring to the handover history information table 171. That is, in the example of FIG. 11, in operation S57, the base station 100-2 transmits HandoverRequestAck to the base station 100-1, and thereafter, in operations S58 to S63, the handover procedure specified in LTE and the like is followed.

Although the terminal 200 deviates from the predicted route and moves along the route Y in the example of FIG. 11, the terminal 200 is handed over from the base station 100-1 to the base station 100-2 only once even in such a case. Accordingly, the frequency of handovers is reduced compared to the case where a plurality of handovers are performed.

Moreover, in this communication system 10, when the terminal 200 deviates from the predicted route, calculation and the like for a handover are not performed by devices other than the base stations 100-1 and 100-2 and the terminal 200. Consequently, this communication system 10 enables processing to speed up compared to the case where calculations are performed by such other devices. Further, since special calculation for a handover is not performed by the terminal 200, power consumption of the terminal 200 may be reduced.

<Handover Control in Accordance with Resource Status>

As the next exemplary operations, handover control in accordance with the resource status will be described. Regarding the exemplary operations of the base sequence, an example where the terminal 200 is handed over to the base station 100-3, not to the base station 100-2, at the point B has been described. In this case, even if the terminal 200 is handed over to the base station 100-3, for example, radio resources (for example, time and frequency) in the base station 100-3 to be used for wireless communications with the terminal 200 are sometimes unable to be allocated to the terminal 200 when the amount of the radio resources is below a certain value (e.g., a fourth threshold value). Accordingly, in this case, the terminal 200 is unable to wirelessly communicate with the station 100-3.

Meanwhile, among the base stations 100-1 to 100-3, the statuses of radio resources are mutually reported. This allows the base station 100-1 to grasp the radio resource statuses of the other base stations 100-2 and 100-3.

In this example of operations, although the base station 100-1 determines the handover target from the content of MeasurementReport provided from the terminal 200, the determination is made on the basis of the resource status of each of the base stations 100-2 and 100-3. Since the control of a handover is performed in consideration of radio resources, the terminal 200 is able to wirelessly communicate with the base station 100-2 or 100-3 after the terminal 200 has been handed over to the base station 100-2 or 100-3.

Note that, in this example of operations, like the example of operations of the base sequence, it is assumed that the terminal 200 moves along the route X illustrated in FIG. 8.

Figure 12:
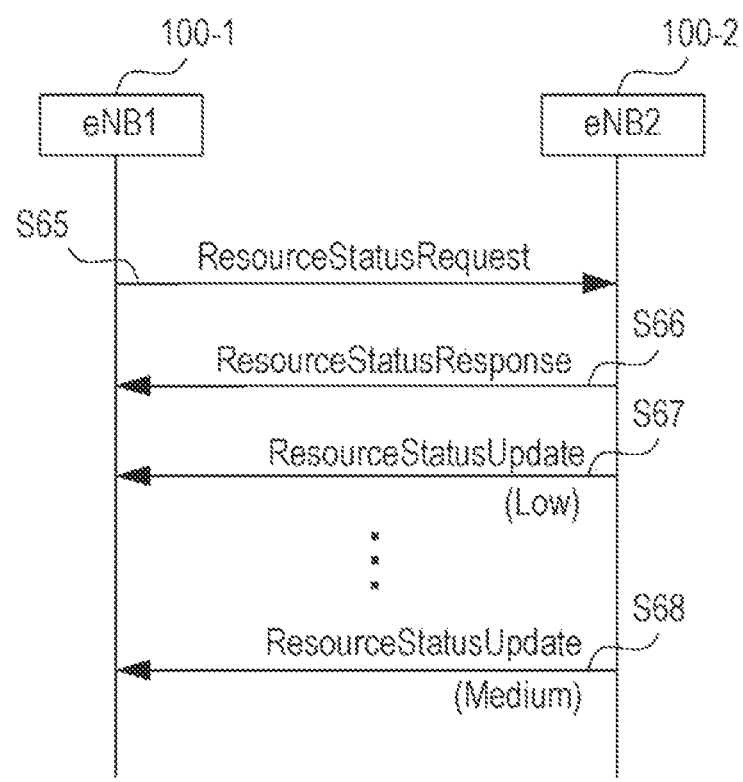
FIG. 12 is a diagram illustrating an example of an operational sequence for exchanging information on radio resources between base stations, according to an embodiment.

FIG. 12 is a diagram illustrating an example of an operational sequence for exchanging information on radio resources between base stations, according to an embodiment. In the example of FIG. 12, the statuses of radio resources are mutually reported between the base stations 100-1 and 100-2. The base station 100-1 transmits ResourceStatusRequest to the base station 100-2 (in operation S65), and the base station 100-2 returns ResourceStatusResponse (in operation S66). Thereafter, the base station 100-2 reports the statuses of its radio resources as ResourceStatusUpdate (in operations S67 to S68).

ResourceStatusUpdate has four setting values, "Low", "Middle", "High", and "Overload". For example, "Low" indicates that there is a sufficient surplus of radio resources, "High" indicates that the surplus of radio resources is below a certain value, "Middle" indicates that the status of radio resources lies about halfway between "Low" and "High", and "Overload" indicates that there is no surplus of radio resources.

The base station 100-2 transmits ResourceStatusUpdate (in operation S67), and thereafter retransmits ResourceStatusUpdate when the setting value changes from that of the informed content (in operation S68).

For example, the CPU 180 of the base station 100-2 may be configured: to allocate the radio resources to terminals subordinate thereto, to set setting values, such as "Low" and "High", in accordance with the results of allocation, and to generate and transmit ResourceStatusUpdate. Generation and transmission of other messages (used in operations S65 and S66) may be also performed, for example, by the CPU 180.

The example of FIG. 12 illustrates an operational sequence between the base station 100-1 and the base station 100-2, and the same sequence as this example may be performed among other base stations. This allows the base station 100-1 to grasp the status of radio resources of not only the base station 100-2 but also base the station 100-3.

In this way, the base station 100-1 may receive reports of the statuses of radio resources from the base stations 100-2 and 100-3. This allows the base station 100-1 to determine the handover target using offset values in accordance with the statuses of radio resources.

FIG. 13 is a diagram illustrating an example of a correspondence table, according to an embodiment. FIG. 13 illustrates a correspondence table 172 representing the correspondence relationship between the resource status and the offset values. For example, when the status of radio resources of the base station 100-2 is "Low", the base station 100-1 adds an offset value of "+20 dBm" and an offset value of "+10 dB" to the value of RSRP and the value of RSRQ for "cell 2", which have been reported as MeasurementReport, respectively. Also, when the status of the radio resources is "High", the base station 100-1 adds an offset value of "−20 dBm" to the value of RSRP for "cell 2" and adds an offset value of "−10 dB" to the value of RSRQ for "cell 2".

Note that the offset values indicated in FIG. 13 are exemplary, and the offset values may be any values other than the values indicated in FIG. 13 if they correspond to the statuses of radio resources.

FIG. 14 is a diagram illustrating an example of radio qualities to which resource offset values are applied, according to an embodiment. FIG. 14 illustrates an example of correspondence between the content of MeasurementReport and radio qualities after resource offset values are taken into consideration. When the radio resource statuses of the base stations 100-1 to 100-3 are "Middle", "Low", and "High", respectively, resource offset values are added to the values of RSRP and RSRQ that have been reported as MeasurementReport. The radio qualities after addition of resource offset values are indicated in the items of the "AFTER CONSIDERATION OF RESOURCE OFFSET" of FIG. 14.

Figure 15:
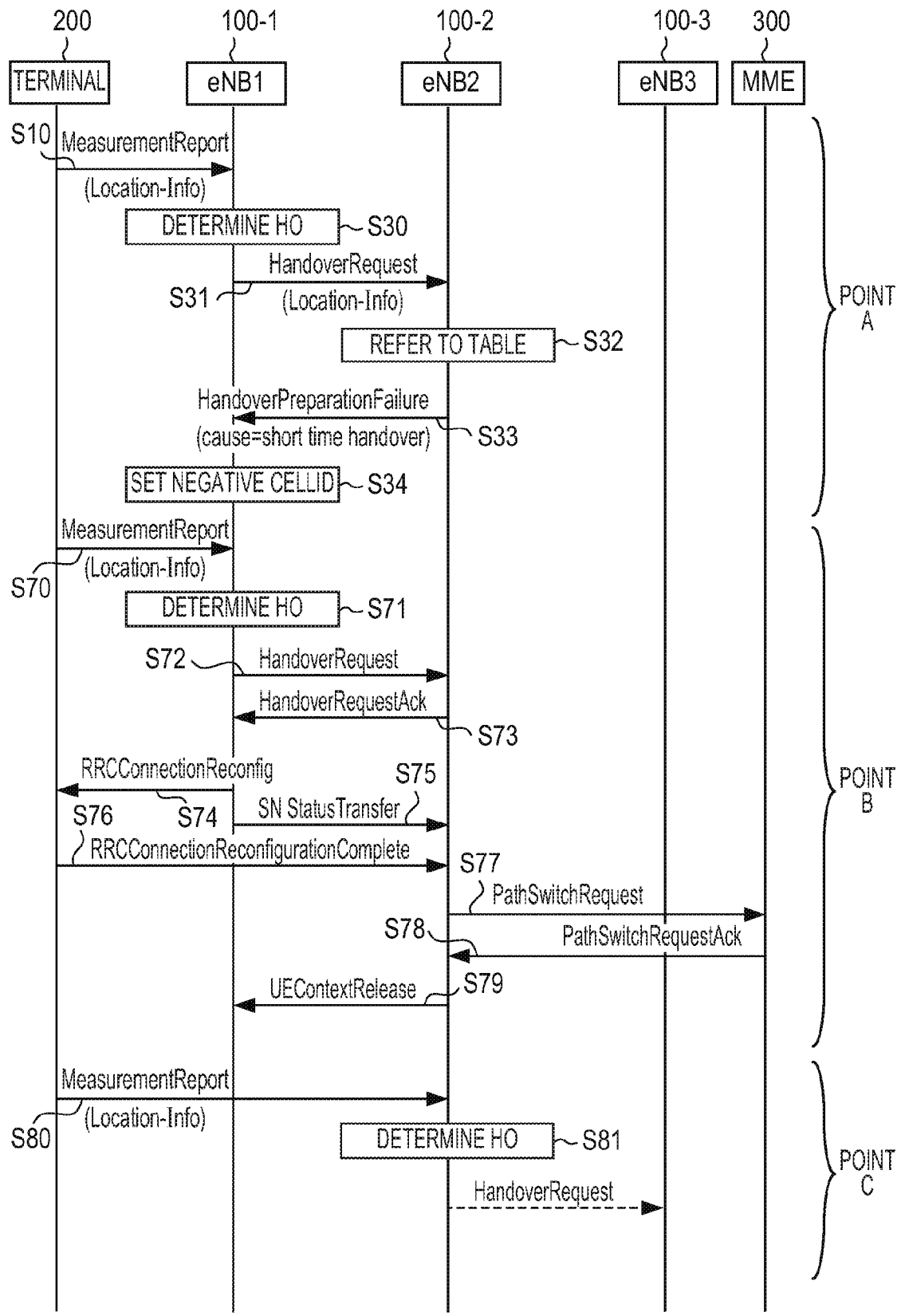
FIG. 15 is a diagram illustrating an example of an operational sequence for handover control in consideration of resource statuses, according to an embodiment.

FIG. 15 is a diagram illustrating an example of an operational sequence for handover control in consideration of resource statuses, according to an embodiment. FIG. 15 illustrates a case where the terminal 200 moves along the route X illustrated in FIG. 8. In FIG. 15, the same processing portions as those in the example of operational sequence for the base sequence (in FIG. 9) are denoted by the same reference characters.

In operation S10, upon moving to the point A, the terminal 200 transmits MeasurementReport. For example, the terminal 200 reports radio qualities indicated by the item of "MeasurementReport" illustrated in FIG. 14.

In operation S30, the base station 100-1 determines that a handover is permitted.

In operation S31, the base station 100-1 transmits HandoverRequest to the base station 100-2.

In operation S32, the base station 100-1 refers to the handover history information table 171, and determines that a handover to the base station 100-2 is difficult.

In operation S33, the base station 100-2 transmits HandoverPreparationFailure to the base station 100-1.

In operation S34, the base station 100-1 sets the cell ID of the base station 100-2 to the "negative cellid".

Then, the terminal 200 moves from the point A to the point B.

In operation S70, at the point B, the terminal 200 transmits MeasurementReport.

In operation S70, the base station 100-1 determines whether to permit a handover. Here, in consideration of both the offset values due to the radio resource status and the offset values due to the "negative cellid", the base station 100-1 determines whether to permit a handover.

FIG. 16 is a diagram illustrating an example of negative cellid offset values and resource offset values, according to an embodiment. In FIG. 16, the item of "MeasurementReport" indicates an example of radio qualities reported in operation S70 by the terminal 200.

Since the cell ID of the base station 100-2 is set as the "negative cellid", the base station 100-1 adds negative-cellid offset values to the radio qualities of the base station 100-2. The radio qualities after addition of the negative-cellid offset values are indicated in the item of "after consideration of negative cellid offset" in FIG. 16.

Resource offset values in which the radio resource statuses are taken into consideration are further added to the respective radio qualities to which offset values due to "negative cellid" have already been added. Radio qualities after addition of these offset values are indicated in the item of "after consideration of resource offset" in FIG. 16.

In FIG. 16, when the offset values due to radio resource statuses are not applied, the radio quality of "Cell 3" (the base station 100-3) is the highest. Therefore, the base station 100-1 determines to perform a handover to the base station 100-3. When offset values in which the radio resource statuses are taken into consideration are applied, the radio quality of "Cell 2" (the base station 100-2) is the highest. Therefore, the base station 100-1 finally determines to perform a handover to the base station 100-2.

In operation S72 of FIG. 15, at the point B, the base station 100-1 determines that the handover target of the terminal 200 is the base station 100-2, and transmits HandoverRequest to the base station 100-2.

At this time, the base station 100-1 transmits HandoverRequest without adding Location-Info thereto.

Therefore, in operation S73, the base station 100-2 performs handover control without referring to the handover history information table 171. That is, in the example of FIG. 15, the base station 100-2 returns HandoverRequestAck to the base station 100-1. Thereafter, the handover procedure specified in LTE, for example, is performed.

In operation S80, when the terminal 200 moves to the point C, the terminal 200 reports the radio qualities in the state of "cell 2<cell 3" as MeasurementReport.

In operation S81, the base station 100-2 has received a report that the radio resources of the base stations 100-2 and 100-3 are "Low" and "High", respectively, and the base station 100-2 adds, to the radio qualities, resource offset values in which the radio resource statuses are taken into consideration. In this case, the radio qualities after offset are in the state of "cell 2>cell 3".

Consequently, the base station 100-2 does not permit a handover to the base station 100-3, and will not transmit HandoverRequest to the base station 100-3. Accordingly, even when the terminal 200 moves to the point C, the terminal 200 remains in a state of wireless connection to the base station 100-2 and will not perform a handover to the base station 100-3.

Accordingly, when the terminal 200 moves at high speed from the point A to the point C, the frequency of handovers is twice, at the point B and at the point C, when radio resources are not taken into consideration, whereas the frequency of handovers is once when control is performed in consideration of radio resources. Accordingly, in this wireless communication system 10, this example of operations performed in consideration of radio resources allows the frequency of handovers to be reduced compared to cases where radio resources are not taken into consideration.

In this wireless communication system 10, the terminal 200 will not be handed over to the base station 100-3 at the point B. Accordingly, it is possible to avoid a situation where after the terminal 200 is handed over to the base station 100-3, a shortage of radio resources inhibits the terminal 200 from wirelessly communicating with the base stations 100-3. In this case, the terminal 200 may be handed over to the base station 100-2 and wirelessly communicate with the base stations 100-2.

Moreover, in this wireless communication system 10, special calculation and the like for a handover are not performed in devices other than the base stations 100-1 and 100-2 and the terminal 200. This enables processing to speed up compared to the case where calculation and the like are performed by such other devices. Since special calculation and the like are not performed in the terminal 200, power consumption of the terminal 200 may be reduced.

Other Embodiments

In the foregoing second embodiment, RSRP and RSRQ have been described as an example of radio qualities. For example, received signal strength indicator (RSSI) and other quality indices may be regarded as radio qualities other than RSRP and RSRQ. The terminal 200 may report either RSRP or RSRQ, not both, as radio quality. This enables the base station 100 to perform operations described in the second embodiment using the reported one of radio qualities. Accordingly, the base station 100 calculates an offset value of "negative cellid" and an offset value of radio resources, for the reported one of radio qualities.

In the foregoing second embodiment, regarding handover control performed in consideration of the resource status, the base station 100-1 adds both an offset value of "negative cellid" and an offset value of radio resources to each radio quality and determines the handover target. For example, the base station 100-1 may add only an offset value of radio resources to each radio quality and determine the handover target based on the radio quality after the addition of the offset value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for reducing handover occurrences in a wireless communication network, the system comprising:
    a terminal;
    a first base station configured to perform wireless communication with the terminal; and
    a second base station configured:
        to predict a handover interval based on handover history information upon receiving from the first base station a handover request for performing a handover of the terminal to the second base station, the handover interval indicating a time period from a first handover time at which a first handover of the terminal is performed from the first base station to the second base station, to a second handover time at which a second handover of the terminal is performed from the second base station to another base station, the handover history information indicating a history of handovers that have been performed by the second base station, and
        to determine whether a handover of the terminal to the second base station is permitted or not, based on the predicted handover interval.

2. The system of claim 1, wherein
when the predicted handover interval is less than a first threshold value, the second base station determines that a handover of the terminal to the second base station is not permitted; and
the first base station transmits the handover request of the terminal to a third base station.

3. The system of claim 2, wherein
the second base station creates the handover history information storing
a frequency value indicating frequency of occurrence of an event that a time period from receiving the handover request to receiving from the third base station a notice indicating permission for the handover request of the terminal that has been transmitted from the second base station to the third base station is less than a second threshold value;
when the frequency value is equal to or greater than a third threshold value, the second base station determines that a handover of the terminal to the second base station is not permitted; and
the first base station transmits the handover request of the terminal to the third base station in accordance with a determination result determined by the second base station.

4. The system of claim 1, wherein
the first base station transmits the handover request of the terminal to the second base station upon receiving from the terminal a measurement result indicating that a quality of wireless transmission between the second base station and the terminal is better than a quality of wireless transmission between the first base station and the terminal.

5. The system of claim 1, wherein
upon receiving from the terminal a measurement result indicating that a quality of wireless transmission between the third base station and the terminal is better than a quality of wireless transmission between the second base station and the terminal, the first base station transmits the first handover request of the terminal to a third base station, in accordance with a determination result determined by the second base station.

6. The system of claim 1, wherein
the second base station creates the handover history information that stores, in association with position information indicating a position of the terminal, a frequency value indicating frequency of occurrence of an event that a time period from receiving the handover request to receiving from the third base station a notice indicating permission for the handover request of the terminal transmitted from the second base station to the third base station is less than a second threshold value.

7. The system of claim 6, wherein
the terminal transmits the position information of the terminal and the handover request of the terminal to the first base station.

8. The system of claim 6, wherein
the first base station transmits the position information of the terminal and the handover request of the terminal to the second base station; and
the second base station determines that a handover of the terminal to the second base station is not permitted, based on the frequency value that is stored in the handover history information in association with the position information transmitted from the first base station.

9. The system of claim 6, wherein
the position information includes information on a position, a velocity, and a bearing of the terminal.

10. The system of claim 1, wherein
for a first quality value indicating quality of wireless transmission between a third base station and the terminal and a second quality value indicating quality of wireless transmission between the second base station and the terminal, the first base station adds an offset value to the second quality value in accordance with a determination result determined by the second base station so that the first quality value indicates quality better than quality indicated by the second quality value.

11. The system of claim 1, wherein
the first base station transmits position information of the terminal and the handover request of the terminal;
upon receiving both the position information of the terminal and the handover request of the terminal, the second base station determines whether a handover of the terminal from the first base station to the second base station is permitted or not;
the first base station transmits the handover request to the second base station without transmitting the position information, when quality of wireless transmission between the first base station and the terminal is lower than quality indicated by a threshold value after it is determined that a handover of the terminal to the second base station is not permitted; and
upon receiving the handover request of the terminal without receiving the position information, the second base station determines that a handover of the terminal to the second base station is permitted.

12. The system of claim 1, wherein
the first base station determines a handover target to which the terminal is to be handed over, based on an usage state of radio resources of the second base station and a third base station in addition to a determination result determined by the second base station.

13. The system of claim 12, wherein
the first base station adds a first offset value to a first quality value indicating quality of wireless transmission between the second base station and the terminal, in accordance with a determination result determined by the second base station;
the first base station adds second and third offset values to a second quality value indicating quality of wireless transmission between the third base station and the terminal and the second quality value, respectively; and
the first base station determines a handover target to which the terminal is to be handed over, based on the first and second quality values to which the first to third offset values have been added.

14. The system of claim 13, wherein
upon receiving from the terminal a measurement result indicating that quality indicated by the first quality value is better than quality indicated by the second quality value after the terminal has been handed over to the second base station, the second base station does not transmit the handover request of the terminal to the third base station.

15. An apparatus for reducing handover occurrences in a wireless communication system including a terminal, a first base station perform wireless communication with the terminal, and a second base stations, the apparatus serving as the second base station, the apparatus comprising:
a memory configured to store handover history information indicating a history of handovers that have been performed by the second base station; and
a processor configured:
to receive a handover request of the terminal from the first base station performing a wireless communication with the terminal,
to predict a handover interval based on the handover history information upon receiving from the first base station a handover request for performing a handover of the terminal to the second base station, the handover interval indicating a time period from a first handover time at which a first handover of the terminal is performed from the first base station to the second base station, to a second handover time at which a second handover of the terminal is performed from the second base station to another base station, and
to determine whether a handover of the terminal to the second base station is permitted or not, based on the predicted handover interval.

16. A method for reducing handover occurrences in a wireless communication system including a terminal, a first base station performing wireless communication with the terminal, and a second base stations, the method comprising:
predicting, by the second base station, a handover interval based on handover history information upon receiving from the first base station a handover request for performing a handover of the terminal to the second base station, the handover interval indicating a time period from a first handover time at which a first handover of the terminal is performed from the first base station to the second base station, to a second handover time at which a second handover of the terminal is performed from the second base station to another base station, the handover history information indicating a history of handovers that have been performed by the second base station, and
determining, by the second base station, whether a handover of the terminal to the second base station is permitted or not, based on the predicted handover interval.

* * * * *